US007113289B1

(12) United States Patent
Beary et al.

(10) Patent No.: US 7,113,289 B1
(45) Date of Patent: Sep. 26, 2006

(54) HIGH ACCURACY ANGULAR RESOLUTION AND MEASUREMENT

(75) Inventors: Daniel A. Beary, Conifer, CO (US); James D. Williams, Evergreen, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 147 days.

(21) Appl. No.: 10/773,067

(22) Filed: Feb. 5, 2004

Related U.S. Application Data

(60) Provisional application No. 60/445,895, filed on Feb. 7, 2003.

(51) Int. Cl.
*G01S 17/06* (2006.01)
(52) U.S. Cl. ..................................... 356/622; 356/620
(58) Field of Classification Search ........... 356/139.01, 356/601, 614, 620, 622
See application file for complete search history.

(56) References Cited

U.S. PATENT DOCUMENTS 5,189,676 A * 2/1993 Wysocki et al. ............... 372/6
6,750,960 B1 * 6/2004 Bowers ................... 356/141.4
6,762,867 B1 * 7/2004 Lippert et al. ............. 359/201
6,864,989 B1 * 3/2005 Storz et al. ................. 356/601
2004/0085261 A1 * 5/2004 Lewis et al. .................. 345/7

* cited by examiner

*Primary Examiner*—Robert P. Swiatek
(74) *Attorney, Agent, or Firm*—Marsh Fischmann & Breyfogle LLP

(57) ABSTRACT

A system and method for use in obtaining precise positional information relating to one or more points. The points may comprise key locations on a large structure allowing for the geometry of the structure to be assessed based on the positional information. In one embodiment, a high accuracy angular resolution and measurement system includes a laser beam source (110), a bi-directional acousto-optic modulator (112), and an optical detector (104). The position of the optical detector (104) is determinable from deflection angles (120, 122) of the laser beam (106) when the laser beam (106) is deflected by the bi-directional acousto-optic modulator (112) in a direction corresponding to one of a plurality of illumination locations (140) coinciding with the position of the optical detector (104) within an illumination region (142) defined by the illumination locations (140).

16 Claims, 5 Drawing Sheets

HIGH ACCURACY ANGULAR RESOLUTION AND MEASUREMENT

RELATED APPLICATION INFORMATION

The present application claims priority from U.S. Provisional Application Ser. No. 60/445,895 entitled "HIGH ACCURACY ANGULAR RESOLUTION AND MEASUREMENT SYSTEM (HAARMS)" and filed on Feb. 7, 2003, the entire disclosure of which is incorporated herein.

FIELD OF THE INVENTION

The present invention relates generally to obtaining precise geometric measurements, and more particularly to the determination of very small angles with great precision over large scan angles from long distances.

BACKGROUND OF THE INVENTION

Large aperture phased array antennas are used in various applications, including on commercial and military satellites. Nominal performance of large aperture phased array antennas requires either precise co-planar surfaces of the radiating elements or highly accurate knowledge of non-planar conditions so that appropriate electronic compensation can be applied. For example, nominal operation of a phased array antenna operating at a frequency f of 10 GHz with a wavelength $\lambda$ of 3 cm depends on maintaining co-planar conditions of about $\frac{1}{25}\lambda=0.12$ cm or 1.2 mm. With large aperture antennas (e.g., apertures>15 meters) a number of factors limit the ability of the structure to maintain such precise geometry, particularly in spacecraft applications.

Construction and testing of a large structure with mechanisms that can accurately deploy within $\frac{1}{100}$ of 1% over the entire aperture is problematic. The effects of thermal expansion and contraction cause distortions in the structure and are a primary concern in design as well. Also, residual movement and deflection of the antenna structure during articulation is difficult to eliminate and add to the problem of maintaining surface accuracy as well as adding weight to the structure. Thus, as the aperture of the antenna increases, the need to incorporate electronic compensation techniques to acquire useful data from the antenna increases proportionally. The ability to effectively apply electronic compensation depends, largely, upon accurate knowledge of the surface of the antenna.

One manner of obtaining the required surface knowledge is to measure the surface, or several key points on the surface. Some measuring devices rely on angular measurements to determine the location of discrete points. However, small changes in the position of the points (e.g., changes on the order of 1.2 mm) are difficult to measure from long distances. For example, to detect a 1.2 mm change in position using a device 150 meters away from the point being measured requires the ability to measure an angular change of 1.2/150000 radians or 1.6 arc-seconds, which is a very small angle. Vibrometers and electronic autocollimators are good position sensors, but their use is typically limited to relatively short distances and small scan angles.

SUMMARY OF THE INVENTION

Accordingly, one object of the present invention is to provide for obtaining precise positional information relating to one or more points that may, for example, be key locations on the surface of a large aperture phased array antenna structure or other large structure.

Another object of the present invention is to measure small positional changes of the point(s) by measuring small angular changes in the direction of a light beam used to illuminate the point(s) over a long distance from the point(s).

A further object of the present invention is to permit the light beam to be quickly and accurately directed over large scan angles thereby allowing the points to be dispersed within a large region.

According to one aspect of the present invention, a measurement system installed on a spacecraft includes a light beam generation and scanning unit positioned on the spacecraft. The light beam generation and scanning unit is operable to generate a light beam and to direct the light beam therefrom in a plurality of directions to illuminate a corresponding plurality of locations within an area on a surface of the spacecraft remote from where the light beam generation and scanning unit is installed. In this regard, the surface of the spacecraft remote from the light beam generation and scanning unit may comprise a surface of a phased array antenna. The measurement system also includes a plurality of optical detectors positioned at various positions on the spacecraft within the area on the surface of the spacecraft remote from the light beam generation and scanning unit. Each of the optical detectors is operable to detect illumination by the light beam when the light beam is directed from the light beam generation and scanning unit in a direction corresponding to one of the locations coinciding with the position of each optical detector. When each optical detector is illuminated by the light beam, information relating to the position of each optical detector is determinable from information relating the direction of the light beam from the light beam generation and scanning unit. In this regard, the optical detectors may be positioned at several key positions on the surface of the phased array antenna permitting determination of information relating to co-planarity of the surface of the phased array antenna from the information relating to the positions of the optical detectors. The information relating to the direction of the light beam from the light beam generation and scanning unit may comprise a first angle of the light beam measured from a first axis (e.g., an x-axis) that is fixed relative to the light beam generation and scanning unit and a second angle of the light beam measured from a second axis (e.g., a y-axis) that is that is fixed relative to the light beam generation and scanning unit and is orthogonal to the first axis. The positions of the optical detectors are determinable from the first and second angles, and such positions can be compared to assess the planarity of the phased array antenna.

In one embodiment, the light beam generation and scanning unit comprises a light source and a bi-directional acousto-optic modulator. The light source may be a coherent light source such as, for example, a laser. The bi-directional acousto-optic modulator may comprise a first acousto-optic modulator in series with a second acousto-optic modulator. Each of the optical detectors may comprise a quadrant optical detector, which allows the position of each optical detector to be determined with greater precision based on the different illumination levels incident on the different segments of each quadrant optical detector.

In order to further enhance the accuracy and reliability of the measurement system, the light beam generation and scanning unit may incorporate a light beam drift monitoring assembly that is operable to measure a difference between an expected direction of the light beam and an actual direction of the light beam. In this regard, the light beam drift monitoring assembly may comprise a beam splitter positioned between the light beam generation and scanning unit and the optical detectors in a path of the light beam and at least one optical detector positioned to receive at least a portion of the light beam from the beam splitter.

In accordance with another aspect of the present invention, a system for use in determining the position of a selected location includes a coherent light source, a bi-directional acousto-optic modulator, and an optical detector. The coherent light source is operable to generate a coherent light beam. The bi-directional acousto-optic modulator is oriented to receive the coherent light beam from the coherent light source and is operable to deflect the coherent light beam in a plurality of directions to illuminate a corresponding plurality of illumination locations. The plurality of illumination locations defines an illumination region. In one embodiment, the illumination region defined by the plurality of illumination locations may comprise at least a portion of a surface of a phased array antenna and the selected location may be a point on the surface of the phased array antenna. In general however, the illumination region may be on the surface of any object, the surface may regularly shaped (e.g., flat, spherical) or irregularly shaped, and the selected location may be on, above or below the surface of the object.

Regardless of the configuration of the illumination region, the optical detector is positioned within the illumination region in a known relation with the selected location. The optical detector is operable to detect illumination by the coherent light beam when the coherent light beam is deflected by the bi-directional acousto-optic modulator in a direction corresponding to one of the plurality of illumination locations coinciding with the position of the optical detector within the illumination region. Information relating to the position of the optical detector (and hence the selected location since the optical detector is positioned in a known relation therewith) is determinable from information relating the direction of the coherent light beam from the bi-directional acousto-optic modulator when the optical detector is illuminated by the deflected coherent light beam. In this regard, the information relating the direction of the coherent light beam from the bi-directional acousto-optic modulator may comprise a first deflection angle of the coherent light beam measured from a first axis (e.g., an x-axis) that is fixed relative to the bi-directional acousto-optic modulator and a second deflection angle of the coherent light beam measured from a second axis (e.g., a y-axis) that is fixed relative to the bi-directional acousto-optic modulator and is orthogonal to the first axis.

In one embodiment of the measurement system, the coherent light source comprises a laser. The bi-directional acousto-optic modulator may comprise two acousto-optic modulators in series, with each acousto-optic modulator comprising a crystal and a piezoelectric transducer. To achieve enhanced accuracy in determining the position of the optical detector, the optical detector may comprise a quadrant optical detector. Also, the accuracy and reliability of the measurement system may be further enhanced by including a light beam drift monitoring assembly operable to measure a difference between an expected direction of the coherent light beam and an actual direction of the coherent light beam. In this regard, the light beam drift monitoring assembly may comprise a beam splitter positioned between the bi-directional acousto-optic modulator and the optical detector in a path of the deflected coherent light beam and at least one quadrant detector positioned to receive at least a portion of the deflected coherent light beam from the beam splitter.

According to a further aspect of the present invention, a method for use in determining the position of a selected location includes the step of generating a coherent light beam. The coherent light beam may, for example, be generated by operating a laser. A bi-directional acousto-optic modulator is operated to deflect the coherent light beam in a plurality of directions to illuminate a corresponding plurality of illumination locations. The plurality of illumination locations defines an illumination region. An optical detector is positioned within the illumination region in a known relation with the selected location. When the coherent light beam is deflected by the bi-directional acousto-optic modulator in a direction corresponding to one of the illumination locations coinciding with the position of the optical detector within the illumination region, the illumination from the coherent light beam is detected with the optical detector, and information relating to the position of the optical detector (and hence the selected location since the optical detector is positioned in a known relation therewith) is determined from information relating to the direction of the coherent light beam from the bi-directional acousto-optic modulator.

In one embodiment of the method of the present invention, the illumination region defined by the plurality of illumination locations comprises at least a portion of a surface of a phased array antenna, the selected location comprises a point on the surface of the phased array antenna, and in the step of positioning the optical detector, the optical detector is mounted on the surface of the phased array antenna in an overlying relationship with the selected location. Thus, the position information that is determined can be used to assess the planarity of the phased array antenna. In general however, the illumination region may be on the surface of any object, the surface may regularly shaped (e.g., flat, spherical) or irregularly shaped, the selected location may be on, above or below the surface of the object, and optical detector may be positioned, below, on or above the surface of the object.

Where the bi-directional acousto-optic modulator comprises a first crystal arranged in series with a second crystal, the step of operating a bi-directional acousto-optic modulator may involve imparting acoustic waves within the first crystal and within the second crystal. Either one or both of the frequency of the acoustic waves imparted in the first crystal and the frequency of the acoustic waves imparted in the second crystal are then periodically changed to change the direction of the coherent light beam and thereby scan the illumination region with the coherent light beam. In this regard, the information relating to the position of the optical detector may be determined by calculating a first deflection angle of the coherent light beam using the frequency of the acoustic waves imparted in the first crystal when the optical detector is illuminated by the coherent light beam, calculating a second deflection angle of the coherent light beam using the frequency of the acoustic waves imparted in the second crystal when the optical detector is illuminated by the coherent light beam, and using the first and second deflection angles to determine the position of the optical detector.

The accuracy of the information relating to the position detector may be enhanced where the optical detector comprises a quadrant detector having four segments. When detecting illumination from the coherent light beam, four separate photocurrents are obtained. Each photocurrent corresponds to a separate one of the segments of the quadrant detector. Thereafter, a ratio of a sum of a first pair of the photocurrents to a sum of all four photocurrents may be computed and a ratio of a sum of a second pair of the photocurrents to a sum of all four photocurrents may also be computed. From such ratios, it is possible to derive the position of the center of the quadrant optical detector relative to center of the illumination location illuminated by the coherent light beam.

The various aspects of the present invention achieve a number of advantages. One advantage is the ability to perform extremely accurate high-resolution angular measurements from a distant location. Another advantage is that system performance can be fine-tuned to meet a wide range of requirements present in various applications. Furthermore, no moving parts are required as scanning of the light beam is accomplished electronically and exact positional information is determined mathematically. Additionally, the self-monitoring and self-calibrating capabilities may be incorporated to accommodate variations in performance due to drift and other external anomalies. Furthermore, while systems and methods in accordance with the present invention are particularly well suited for making geometric measurements of large phased array antenna structures thereby facilitating the use of electronic compensation techniques, the systems and methodologies of the present invention can, in general, be extended to any circumstance requiring very precise measurements from remote and distant locations. For example, a system in accordance with the present invention can be used as a calibration device for artillery to determine deflections of barrels resulting from thermal effects. By way of further example, a system in accordance with the present invention may also be incorporated within a theodilite system for extremely accurate measurements.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
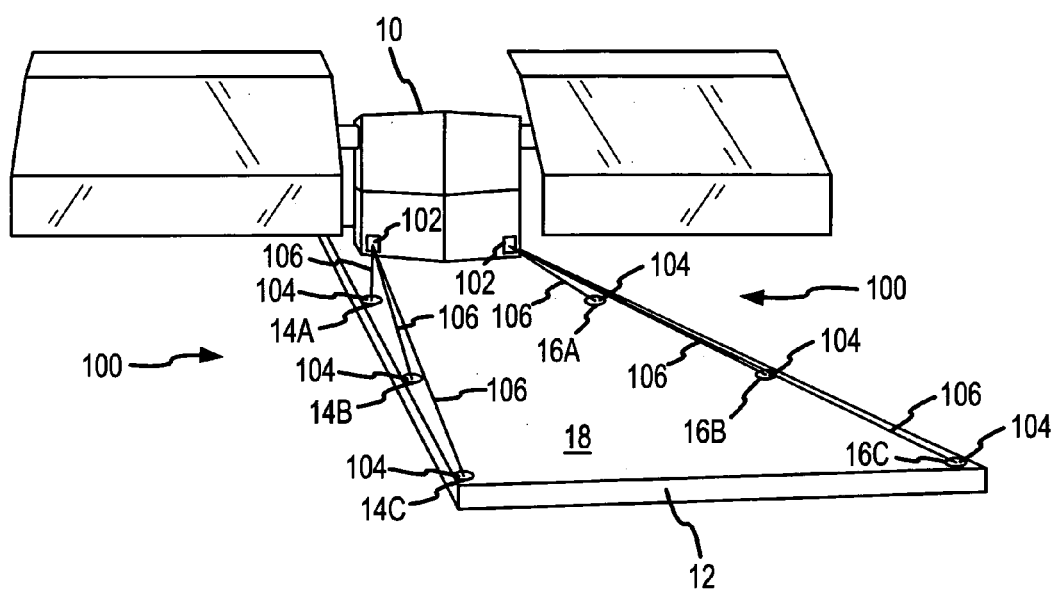
FIG. 1 is a perspective view of one embodiment of a high accuracy angular resolution and measurement system in accordance with the present invention deployed on-board a spacecraft.

Referring now to FIG. 1, there is shown a spacecraft 10 having a phased array antenna 12 with two high accuracy angular resolution and measurement systems (HAARMS) 100 deployed on-board the spacecraft 10. The HAARMS 100 are positioned on the spacecraft 10 in a manner permitting the HAARMS 100 to be used to obtain highly accurate measurements of several key locations 14A–14C, 16A–16C of the antenna 12. The measurements obtained using the HAARMS 100 provide information that can be utilized to assess the planarity of the surface 18 of the phased array antenna 12 thereby allowing appropriate electronic compensation to be applied to the radiating elements of the antenna 12 to compensate for non-planar conditions of the antenna 12 and thus improve performance of the antenna 12.

In the illustrated embodiment, each HAARMS 100 includes a laser beam generation and scanning unit 102 and three optical detectors 104 associated therewith. The optical detectors 104 are positioned at the key locations 14A–14C, 16A–16C. Each laser beam generation and scanning unit 102 is positioned at a convenient location on the spacecraft 10 that provides each laser beam generation and scanning unit 102 with an unobstructed view of the optical detectors 104 associated therewith. This allows each laser beam generation and scanning unit 102 to illuminate its associated optical detectors 104 with a laser beam 106 directed therefrom. Although FIG. 1 shows two HAARMS 100 deployed on the spacecraft 10 with each HAARMS including three optical detectors 104 associated with a single laser beam generation and scanning unit 102, it should be noted that fewer or more HAARMS 100 may be deployed on the spacecraft 12, and each HAARMS 100 may include one, two, three or more optical detectors 104 that are associated with one or more laser beam generation and scanning units 102. Further, although three laser beams 106 are shown being directed from each light beam generation and scanning unit 102 to its associated optical detectors 104, in operation only a single laser beam 106 is typically directed from a single laser beam generation and scanning unit 102 at a time towards a single associated optical detector 104. Three laser 106 beams are illustrated in FIG. 1 to show that each laser beam generation and scanning unit 102 is capable of directing a laser beam 106 therefrom to anyone of its associated optical detectors 104.

Figure 2:
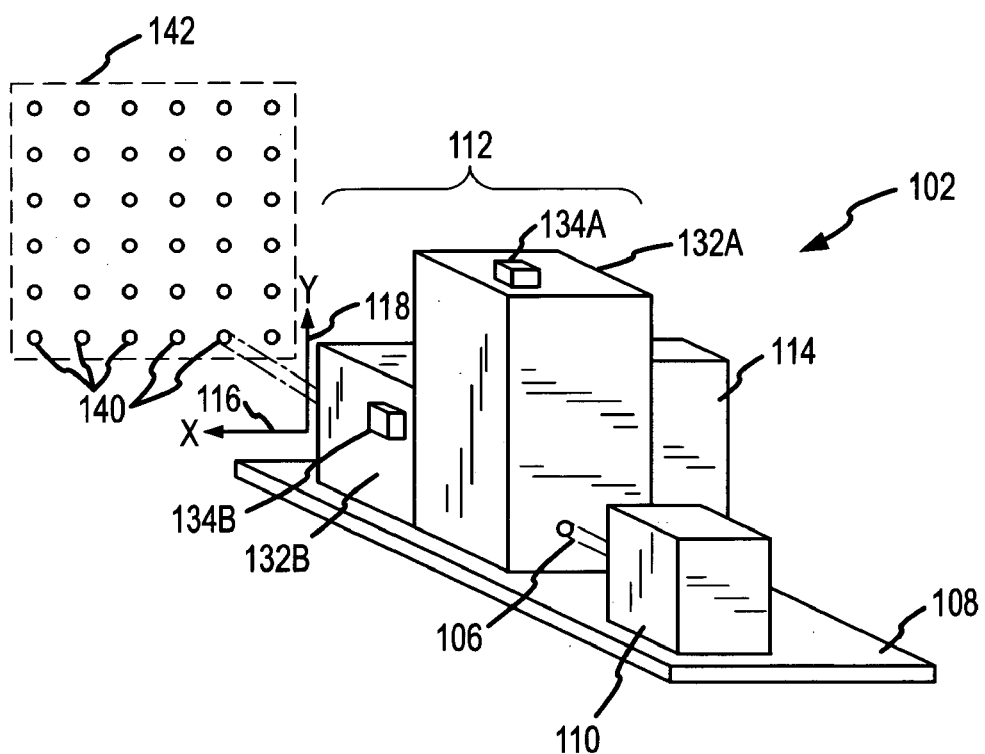
FIG. 2 is a perspective view of one embodiment of a laser beam generation and scanning unit of a high accuracy angular resolution and measurement system in accordance with the present invention.
Figure 3A:
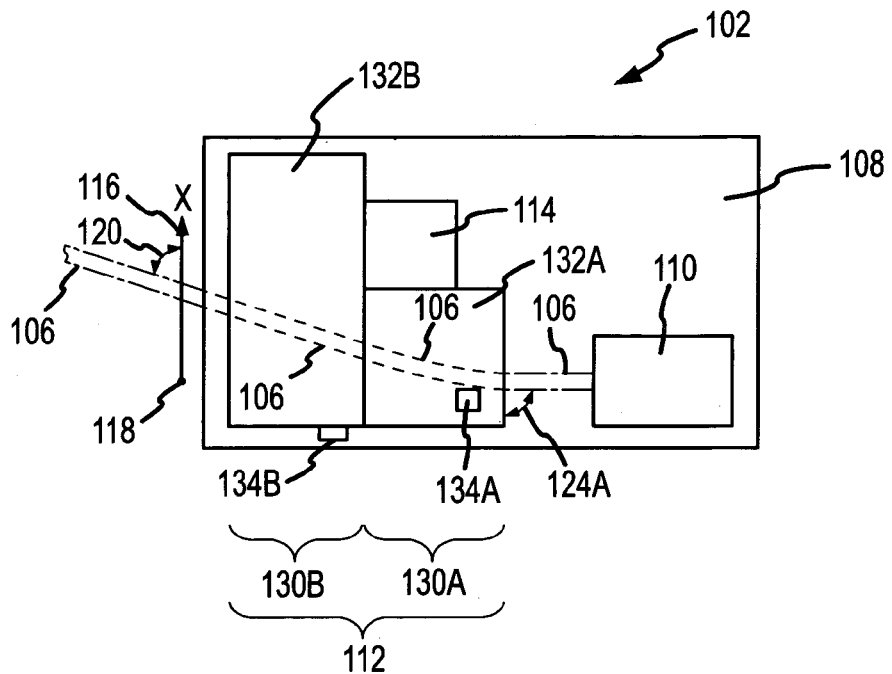
FIGS. 3A–3B are top and side views, respectively, of the embodiment of the laser beam generation and scanning unit shown in FIG. 2.
Figure 3B:
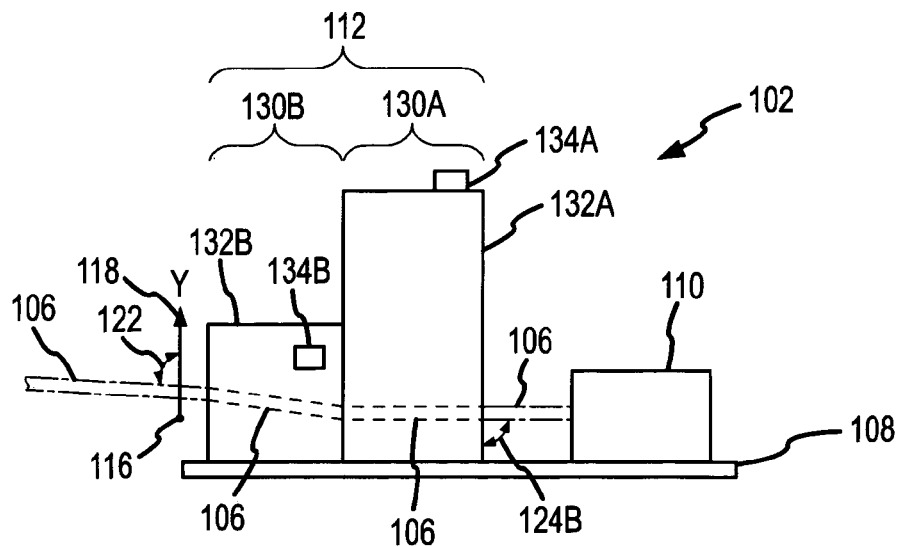

In FIGS. 2 and 3A–3B, the light beam generation and scanning unit 102 of a single HAARMS 100 is shown in greater detail. The laser beam generation and scanning unit 102 includes a laser beam source 110 (e.g., a laser diode), a bi-directional acousto-optic modulator 112, and a control electronics package 114 for controlling the operation of the laser beam source 110 and the bi-directional acousto-optic modulator 112. The laser beam source 110, bi-directional acousto-optic modulator 112, and control electronics package 114 may all be mounted on a circuit board 108. The laser beam source 110 is oriented so that, when activated under the control of the electronics package 114, it generates a laser beam 106 that is directed into the bi-directional acousto-optic modulator 112. The bi-directional acousto-optic modulator 112 is operable under the control of the electronics package 114 to deflect the laser beam 106 at various angles measured from two generally orthogonal axes fixed relative to the bi-directional acousto optic modulator 112 (e.g., the x-axis 116 and y-axis 118) in order to scan a portion of the surface 18 of the phased array antenna 12 with the laser beam 106. In this regard, the bi-directional acousto-optic modulator 112 can deflect the laser beam 106 at a first deflection angle 120 measured from the x-axis 116 and a second deflection angle 122 measured from the y-axis 118. Since the bi-directional acousto-optic modulator 112 is operable to deflect the laser beam 106 at various angles measured from two generally orthogonal axes, it may also be identified herein and elsewhere as an x-y acousto-optic modulator 112.

The bi-directional acousto-optic modulator 112 may include two single axis acousto-optic modulators 130A, 130B arranged in series with one another. Each acousto-optic modulator 130A, 130B may comprise a crystal 132A, 132B with a piezoelectric transducer 134A, 134B contacting a surface of the crystal 132A, 132B. The electronics package 114 directs the piezoelectric transducers 134A, 134B to impart traveling acoustic waves within their respective crystals 132A, 132B. The acoustic waves cause spatially periodic variations in the density of the crystals 132A, 132B, which alters the refractive indexes of the crystals 132A, 132B. By controlling the piezoelectric transducers 134A, 134B to alter the frequency of the acoustic waves within the crystals 132A, 132B, the refractive indexes of the crystals 132A, 132B can be controlled. This allows the laser beam 106 to be deflected in one direction as it traverses each crystal 132A, 132B (e.g., either the x or the y direction depending upon the orientation of the each crystal 132A, 132B). Pairing two acousto-optic modulators 130A, 130B in series allows for controlled deflection of the laser beam 106 in two directions (e.g., both the x and y directions). Since no moving components are employed, the direction of the laser beam 106 can be altered very quickly and very precisely.

When the light beam generation and scanning unit 102 is operated, the laser beam source 110 generates a laser beam 106 that is transmitted therefrom into the bi-directional acousto-optic modulator 112. As the laser beam 106 is transmitted from the laser beam source 110, the control electronics package 114 varies the frequency of the acoustic waves imparted by the piezoelectric transducers 134A, 134B in the crystals 132A, 132B to vary the direction of the laser beam 106 exiting from the bi-directional acousto-optic modulator 112. In this regard, the laser beam 106 can be directed in a plurality of discrete directions defined by different combinations of the first and second deflection angles 120, 122 to illuminate a corresponding plurality of discrete illumination locations or spots 140. The plurality of illumination spots 140 together define an illumination region 142. As may be appreciated, adjacent illumination spots 140 may or may not overlap depending on factors such as the resolution of the bi-directional acousto-optic modulator 112 and the width of the laser beam 106 at the distance from the bi-directional acousto-optic modulator 112 to the illumination region 142. The illumination region 142 may, for example, comprise a portion of the surface 18 of a phased array antenna 12 mounted on a spacecraft 10 such as shown in FIG. 1. In general however, the illumination region may be on any large structure.

The number of discrete illumination spots 140 depends upon factors such as the ranges of the first and second deflection angles 120, 122 achievable with the bi-directional acousto-optic modulator 112 and the resolution of the bi-directional acousto-optic modulator 112 within such ranges. For example, some commercially available bi-directional acousto-optic modulators 112 have first and second deflection angle 120, 122 ranges of about 45 milli-radians with a resolution of about 400×400 discrete illumination spots 140 for a total of 160,000 discrete illumination spots 140. This equates to about 2.6 degrees of deflection angle range, which is suitable for close order measurements. In certain instances, such as where the baseline distance between the bi-directional acousto-optic modulator 112 and the optical detector 104 is longer, narrower deflection angles may be necessary. Narrower deflection angles may be achieved in a number of manners. For example, since the deflection angles 120, 122 depend in part on the incident angles 124A, 124B of the laser beam 106 as it enters the first crystal 132A, the ranges of the deflection angles 120, 122 can be narrowed by reducing the incident angles 124A, 124B of the laser beam 106 by, for example, altering the relative orientation of the laser beam source 110 and the bi-directional acousto-optic modulator 112. By way of further example, optical narrowing of the deflection angles 120, 122 may be achieved with one or more lenses at the output of the second crystal 132B of the bi-directional acousto-optic modulator. If desired, the optical narrowing and incident angle techniques can be combined. Other possible techniques include operating the piezoelectric transducers 134A, 134B over a larger range of frequencies and changing the wavelength of the laser beam source 110, either or both of which may be combined with the previously mentioned techniques.

Figure 4:
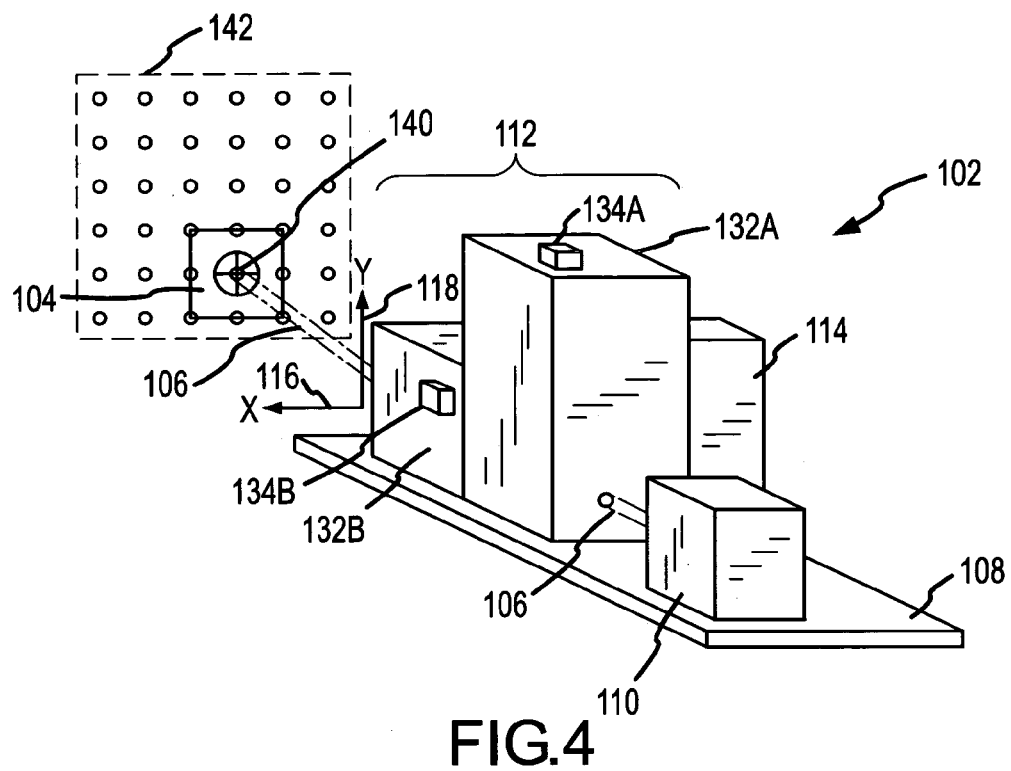
FIG. 4 is a perspective view of one embodiment of a laser beam generation and scanning unit illuminating an optical detector of a high accuracy angular resolution and measurement system in accordance with the present invention.

As depicted in FIG. 4, when the laser beam 106 is directed by the bi-directional acousto-optic modulator 112 onto a spot 140 coinciding with the position of the optical detector 104 within the illumination region 142, the optical detector 104 detects illumination from the laser beam 106 incident on the optical detector 104. An estimate of the position of the detector 104 can be determined based on information relating to the direction of the laser beam 106 from the bi-directional acousto-optic modulator 112 when the optical detector 106 is illuminated. In this regard, the first and second deflection angles 120, 122 can be determined mathematically based upon the frequency of the acoustic waves imparted in the crystals 132A, 132B by the piezoelectric transducers 134A, 134B and the refractive characteristics of the crystals 132A, 132B (which are typically specified by the manufacturers and may be customized to meet the needs of various applications). By knowing the first and second deflection angles 120, 122 when the laser beam 106 illuminates the optical detector 104, the position of the optical detector 104 can be determined.

Figure 5:
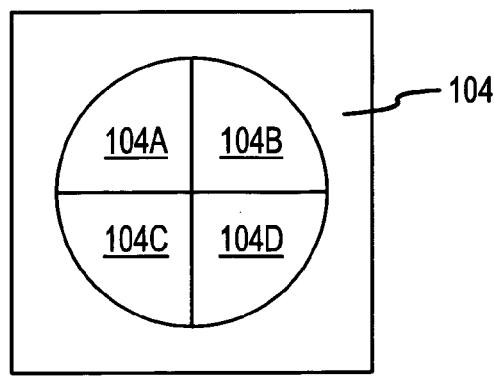
FIG. 5 is a top view of one embodiment of a quadrant optical detector of a high accuracy angular resolution and measurement system in accordance with the present invention.

As shown in FIG. 5, the optical detector 104 may comprise a quadrant optical detector 104 having, for example, four distinct segments 104A-104D. Employing a quadrant optical detector 104 allows the position of the quadrant optical detector 104 when illuminated by the laser beam 106 to be determined with greater precision. As depicted, the illuminated spot 140 may not be centered on the quadrant optical detector 104. However, the exact position of the center of the quadrant optical detector 104 with respect to the illuminated spot 140 can be found based on variations in the illumination levels on the different segments 104A–104D of the quadrant optical detector 104 as a ratio of the total illumination level on the quadrant optical detector 104. In this regard, the following summing formulas may be employed:

$$Xposition = \frac{(A+C)-(B+D)}{(A+B+C+D)} \quad (1)$$

$$Yposition = \frac{(A+B)-(C+D)}{(A+B+C+D)} \quad (2)$$

wherein A, B, C, and D are the photocurrents produced in each segment 104A–104D, respectively, of the four-quadrant optical detector 104, and Xposition and Yposition are the x and y axis 116, 118 positions, respectively, of the center of the four-quadrant optical detector 104 relative to the center of the illuminated spot 140. The computations represented in equations (1) and (2) may be efficiently accomplished using commercially available high performance circuits.

Figure 6:
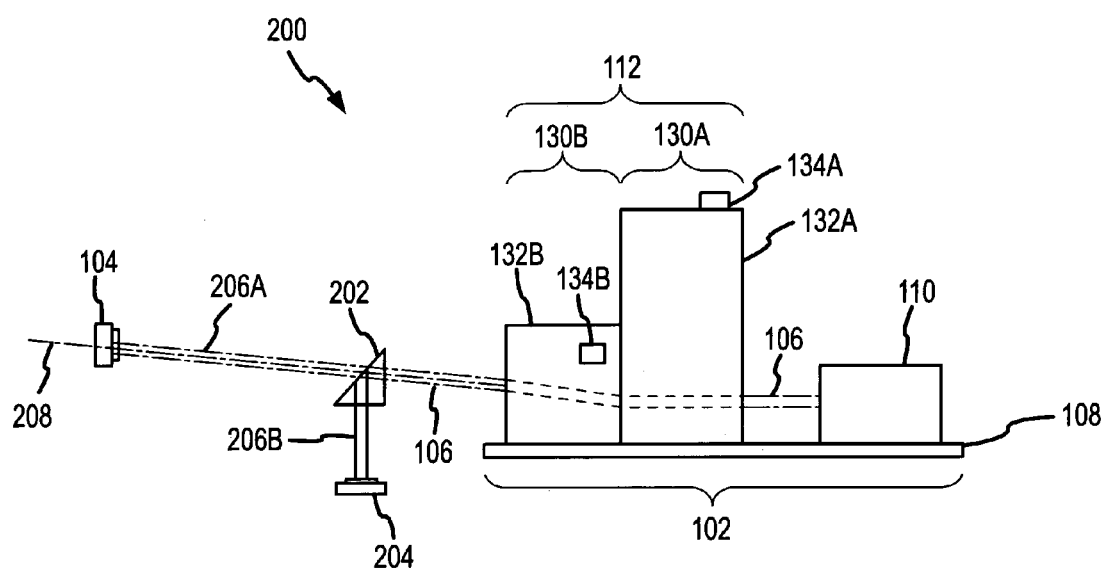
FIG. 6 is a side view of one embodiment of a high accuracy angular resolution measurement system in accordance with the present invention having laser beam drift monitoring capabilities.

Referring now to FIG. 6, another embodiment of a HAARMS 200 is illustrated which incorporates laser beam 106 drift monitoring capabilities. In FIG. 6, the same reference numerals as used in FIGS. 1–5 are used to identify similar components. A HAARMS 200 such as shown in FIG. 6 may be used anywhere a HAARMS 100 without drift monitoring capabilities can be used, such as on-board a spacecraft as shown in FIG. 1.

The direction of the deflected laser beam 106 as it exits the bi-directional acousto-optic modulator 112 may drift over time from the direction expected for a particular combination of acoustic wave frequencies due, for example, to temperature variations within the crystals 132A, 132B. In this regard, the acoustic energy imparted to the crystals 132A, 132B can cause the temperature of the crystals to change thereby altering the density of the crystals 132A, 132B and thus their refractive properties. Altering the refractive properties of the crystals 132A, 132B changes the first and second deflection angles 120, 122 from the angles expected for a particular combination of acoustic wave frequencies. In order to monitor such drift, the HAARMS 200 of FIG. 6 incorporates a beam splitter 202 and a secondary optical detector 204.

The beam splitter 202 is positioned between the output of the bi-directional acousto-optic modulator 112 and the optical detector 104 (or detectors 104) on the surface 18 of the antenna 12 (or other large structure). The beam splitter splits the deflected laser beam 106 into a primary portion 206A which continues on the same axial pathway 208 followed by the laser beam 106 upon exiting the bi-directional acousto-optic modulator 112 and a diverted portion 206B that is directed off the axial pathway 208 to the secondary optical detector 204. Drift of the diverted portion 206B which corresponds to drift of the laser beam 106 exiting the bi-directional acousto-optic modulator is monitored using the secondary optical detector 204. In this regard, the secondary optical detector 204 may comprise a quadrant optical detector having, for example, four segments such as shown in FIG. 5. In a manner similar to that described in connection with FIG. 5, movement of the illumination spot of the diverted portion 206B of laser beam 106 on the secondary optical detector 204 can be measured. Once the amount of drift is known, such drift can be appropriately compensated for in determining the position of the primary optical detector 104.

In addition to measuring drift of the laser beam 106 with a drift monitoring assembly (i.e. the beam splitter 202 and secondary optical detector 204) such as shown in FIG. 6, undesired drift of the laser beam 106 in a HAARMS 200 such as shown in FIG. 6 or even a HAARMS 100 without laser beam 106 drift monitoring capabilities such as illustrated in FIGS. 2–4 can be limited. In this regard, the piezoelectric transducers 134A–134B may be operated in a pulsed manner to reduce heating of the crystals 132A–132B. Alternatively, the piezoelectric transducers 134A–134B 110 may be operated almost continuously in order to achieve a steady state temperature in the crystals 132A–132B.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A system for use in determining the position of a selected location, said system comprising:
   a coherent light source operable to generate a coherent light beam;
   a bi-directional acousto-optic modulator oriented to receive the coherent light beam from said coherent light source and operable to deflect the coherent light beam in a plurality of directions to illuminate a corresponding plurality of illumination locations, wherein the plurality of illumination locations defines an illumination region; and
   an optical detector positioned within the illumination region in a known relation with the selected location, said optical detector being operable to detect illumination by the deflected coherent light beam when the coherent light beam is deflected by said bi-directional acousto-optic modulator in a direction corresponding to one of said plurality of illumination locations coinciding with the position of said optical detector within the illumination region;
   wherein information relating to the position of said optical detector is determinable from information relating the direction of the coherent light beam from said bi-directional acousto-optic modulator when said optical detector is illuminated by the deflected coherent light beam.

2. The system of claim 1 wherein said coherent light source comprises a laser.

3. The system of claim 1 wherein said bi-directional acousto-optic modulator comprises two acousto-optic modulators in series.

4. The system of claim 3 wherein each said acousto-optic modulator comprises a crystal and a piezoelectric transducer.

5. The system of claim 1 wherein said optical detector comprises a quadrant optical detector.

6. The system of claim 1 further comprising:
   a light beam drift monitoring assembly operable to measure a difference between an expected direction of the coherent light beam and an actual direction of the coherent light beam.

7. The system of claim 6 wherein said light beam drift monitoring assembly comprises:
   a beam splitter positioned in a path of the deflected coherent light beam between said bi-directional acousto-optic modulator and said optical detector; and
   at least one quadrant detector positioned to receive at least a portion of the deflected coherent light beam from said beam splitter.

8. The system of claim 1 wherein the illumination region defined by the plurality of illumination locations comprises at least a portion of a surface of a phased array antenna.

9. The system of claim 1 wherein the information relating the direction of the coherent light beam from said bi-directional acousto-optic modulator comprises:
   a first deflection angle of the coherent light beam measured from a first axis; and
   a second deflection angle of the coherent light beam measured from a second axis orthogonal to the first axis.

10. A method for determining the position of a selected location, said method comprising:
    generating a coherent light beam;
    operating a bi-directional acousto-optic modulator to deflect the coherent light beam in a plurality of directions to illuminate a corresponding plurality of illumination locations, wherein the plurality of illumination locations defines an illumination region;

positioning an optical detector within the illumination region in a known relation with the selected location;

detecting illumination from the coherent light beam with the optical detector when the coherent light beam is deflected by the bi-directional acousto-optic modulator in a direction corresponding to one of the illumination locations coinciding with the position of the optical detector within the illumination region; and determining information relating to the position of the optical detector from information relating to the direction of the coherent light beam from the bi-directional acousto-optic modulator when the optical detector is illuminated by the coherent light beam.

11. The method of claim 10 wherein said step of generating a coherent light beam comprises:

operating a laser to generate the coherent light beam.

12. The method of claim 10 wherein the bi-directional acousto-optic modulator comprises a first crystal arranged in series with a second crystal, and wherein said step of operating a bi-directional acousto-optic modulator comprises:

imparting acoustic waves within the first crystal and within the second crystal; and periodically changing at least one of a frequency of the acoustic waves imparted in the first crystal and a frequency of the acoustic waves imparted in the second crystal.

13. The method of claim 12 wherein said step of determining information relating to the position of the optical detector comprises:

calculating a first deflection angle of the coherent light beam using the frequency of the acoustic waves imparted in the first crystal when the optical detector is illuminated by the coherent light beam;

calculating a second deflection angle of the coherent light beam using the frequency of the acoustic waves imparted in the second crystal when the optical detector is illuminated by the coherent light beam; and using the first and second deflection angles to determine the position of the optical detector.

14. The method of claim 10 wherein the illumination region defined by the plurality of illumination locations comprises at least a portion of a surface of a phased array antenna, wherein the selected location comprises a point on the phased array antenna, and wherein said step of positioning an optical detector comprises:

mounting the optical detector on the surface of the phased array antenna in an overlying relationship with the selected location.

15. The method of claim 10 wherein the optical detector comprises a quadrant detector having four segments, and wherein said step of detecting illumination from the coherent light beam comprises:

obtaining four photocurrents, wherein each photocurrent corresponds with a separate one of the segments of the quadrant detector.

16. The method of claim 15 wherein said step of determining information relating to the position of the optical detector comprises:

computing a ratio of a sum of a first pair of the photocurrents to a sum of all four photocurrents; and computing a ratio of a sum of a second pair of the photocurrents to a sum of all four photocurrents.

* * * * *